US009166656B2

(12) United States Patent
Pirazzini

(10) Patent No.: US 9,166,656 B2
(45) Date of Patent: Oct. 20, 2015

(54) METHOD AND DEVICE FOR THE OPTIMIZED TRANSMISSION OF REMOTE CONTROL SIGNALS PARTICULARLY OF GATES, DOORS AND BARRIERS

(75) Inventor: Massimo Pirazzini, Bevilacqua (IT)

(73) Assignee: FAAC S.P.A., Zola Predosa (BO) (IT)

( * ) Notice: Subject to any disclaimer, the term of this patent is extended or adjusted under 35 U.S.C. 154(b) by 348 days.

(21) Appl. No.: 13/695,826

(22) PCT Filed: Apr. 20, 2011

(86) PCT No.: PCT/IB2011/000901
§ 371 (c)(1),
(2), (4) Date: Dec. 18, 2012

(87) PCT Pub. No.: WO2011/138651
PCT Pub. Date: Nov. 10, 2011

(65) Prior Publication Data
US 2013/0090070 A1    Apr. 11, 2013

(30) Foreign Application Priority Data
May 3, 2010    (IT) .............................. MI2010A0768

(51) Int. Cl.
*H04W 24/02*    (2009.01)
*H04B 7/005*    (2006.01)
*G08C 17/02*    (2006.01)

(52) U.S. Cl.
CPC ................ *H04B 7/005* (2013.01); *G08C 17/02* (2013.01)

(58) Field of Classification Search
CPC ........... H04B 7/005; H04B 2001/1072; H04B 7/0417; H04B 17/15; H04B 17/29; H04W 24/02

USPC .................. 455/522, 62, 63.1, 67.11, 69, 71; 340/4.11, 5.71, 12.22, 539.1, 539.11, 340/539.17, 815.6
See application file for complete search history.

(56) References Cited

U.S. PATENT DOCUMENTS

| | | | |
|---|---|---|---|
| 4,584,504 A * | 4/1986 | Lee et al. ........................ | 318/16 |
| 6,978,126 B1 | 12/2005 | Blaker | |
| 8,854,019 B1 * | 10/2014 | Levesque et al. ............. | 323/266 |
| 2008/0280638 A1 * | 11/2008 | Malladi et al. ................ | 455/522 |

FOREIGN PATENT DOCUMENTS

GB    2314485 A    12/1997

OTHER PUBLICATIONS

International Search Report Jun. 29, 2011.

* cited by examiner

*Primary Examiner* — Andrew Wendell
(74) *Attorney, Agent, or Firm* — Hedman & Costigan, P.C.; James V. Costigan; Kathleen A. Costigan

(57) ABSTRACT

The present invention refers to a method and to a device for the optimized transmission of remote control signals particularly but not exclusively used to open or close gates, doors and automatic barriers, in which the method (100) for the optimized transmission of remote control signals comprises a phase consisting of transmitting (110) a remote control signal at a carrier frequency through a via-ether transmission interface (11) and it is characterised in that it comprises in addition the phases consisting of receiving (120) through a via-ether receiving means (12) the transmitted remote control signal and measuring its radiated power, and varying (130) the transmitted remote control signal so as to maximize said measured radiated power.

14 Claims, 3 Drawing Sheets

METHOD AND DEVICE FOR THE OPTIMIZED TRANSMISSION OF REMOTE CONTROL SIGNALS PARTICULARLY OF GATES, DOORS AND BARRIERS

The present invention refers to a method and to a device for the optimized transmission of remote control signals particularly but not exclusively used for opening or closing gates, doors and automatic barriers. Currently different devices are known for transmitting remote control signals via radio to open and close automatic access points to private areas, also known as radio controls.

Such transmission devices can be actuated manually, through a button by a user.

They generally comprise a transmitting antenna, which is connected to digital storage means associated with an elaboration unit.

Indeed, controlling the opening or closing of an automatic gate, for example, occurs thanks to the transmission of remote control signals containing an identification code, from the radio control, and the subsequent receiving of such remote control signals by a receiving station located, preferably, at the automatic gate itself.

The identification codes of the remote control signals are usually recorded in the digital storage means by the manufacturer of the radio control itself at the moment when it is made or it is set manually at the moment of installation.

Known transmitting devices, however, have some drawbacks due to a reduction in transmitting performance with respect to the expected design values. One of the possible causes for such a reduction is linked to the tolerance of the components of the radio part of the transmitting device.

Each electronic component is characterised by a nominal value and a tolerance that indicates the deviation of the real value from the nominal one.

Therefore, transmitting devices belonging to the same series also consist of electronic components that are nominally identical by are really different from one another.

Such variability is the cause of reduction of the performance of the transmitting devices since for the same power supplied such devices irradiate a different power from one another.

Another of the possible causes of reduction in performance of transmitting devices is the degradation of the power of the signal due to the presence of the user's hand or other near to or even over the transmitting antenna.

Indeed, the relative position of the user's hand with respect to such an antenna has a substantial impact upon the radiated power and thus on the range of the transmitting device.

The range of a transmitting device is indeed defined as the distance beyond which the signal sent by the device is attenuated so as to make it indistinguishable from the noise signal.

Therefore, it is underlined that a displacement of the user's hand by a few millimetres generally corresponds to a substantial variation in radiated power by the antenna of the transmitting device.

The combined effect of the causes of reduction in performance in transmission described up to now can lead to fluctuations of the radiated power of a transmitting device that can in some cases even reach 6 dB that corresponds, purely theoretically, to a halving of the range.

A partial solution to the aforementioned drawbacks is provided by the use of a transceiver device like for example the one described in U.S. Pat. No. 6,978,126. Such a transceiver device comprises at least one tuneable transmitting antenna coupled with varactor diodes arranged to vary the tuning frequency of the antenna itself in order to maximise the voltage applied across the antenna and thus the power available for via-ether transmission. It is important to emphasise that the measurement of the voltage across the transmitting antenna is carried out by a measuring circuit coupled through wire connection with the antenna itself. The tuning frequency of the transmitting antenna, therefore, is selected at the maximum voltage value measured by such a measuring circuit.

The use of a device according to U.S. Pat. No. 6,978,126 in any case suffers from the drawbacks due to the effect of load inevitably exerted on the transmitting antenna by the different infrastructures that surround it (over a very short distance) or possibly by the hand that comes up to the radio control to actuate it, and due to the source load effect from the circuit that generates the radio frequency signal. Indeed, following such load effects it occurs, in most cases, that the condition of maximum power actually radiated by the transmitting antenna does not correspond to the maximum voltage across it, i.e. the power theoretically available.

The purpose of the present invention is to make a method for the transmission of remote control signals capable of solving the aforementioned drawbacks of the prior art in an extremely simple, cost-effective and particularly functional way.

Another purpose of the present invention is to provide a method for the transmission of remote control signals capable of reducing the degradation in transmission performance.

A further purpose of the present invention is to make a remote control transmitting device capable of irradiating a certain power irrespective of the tolerances of the components of which it consists and the type of grip of its user's hand.

Another purpose of the present invention is to devise a remote control transmitting device with a substantially constant range.

These and other purposes according to the present invention are accomplished by making a method and a transmitting device as outlined in the independent claims.

Further characteristics of the method and device are the object of the dependent claims.

The characteristics and advantages of a method and of a device for the optimized transmission of remote control signals according to the present invention will become clearer from the following description, given as an example and not for limiting purposes, referring to the attached schematic drawings, in which.

Figure 1:
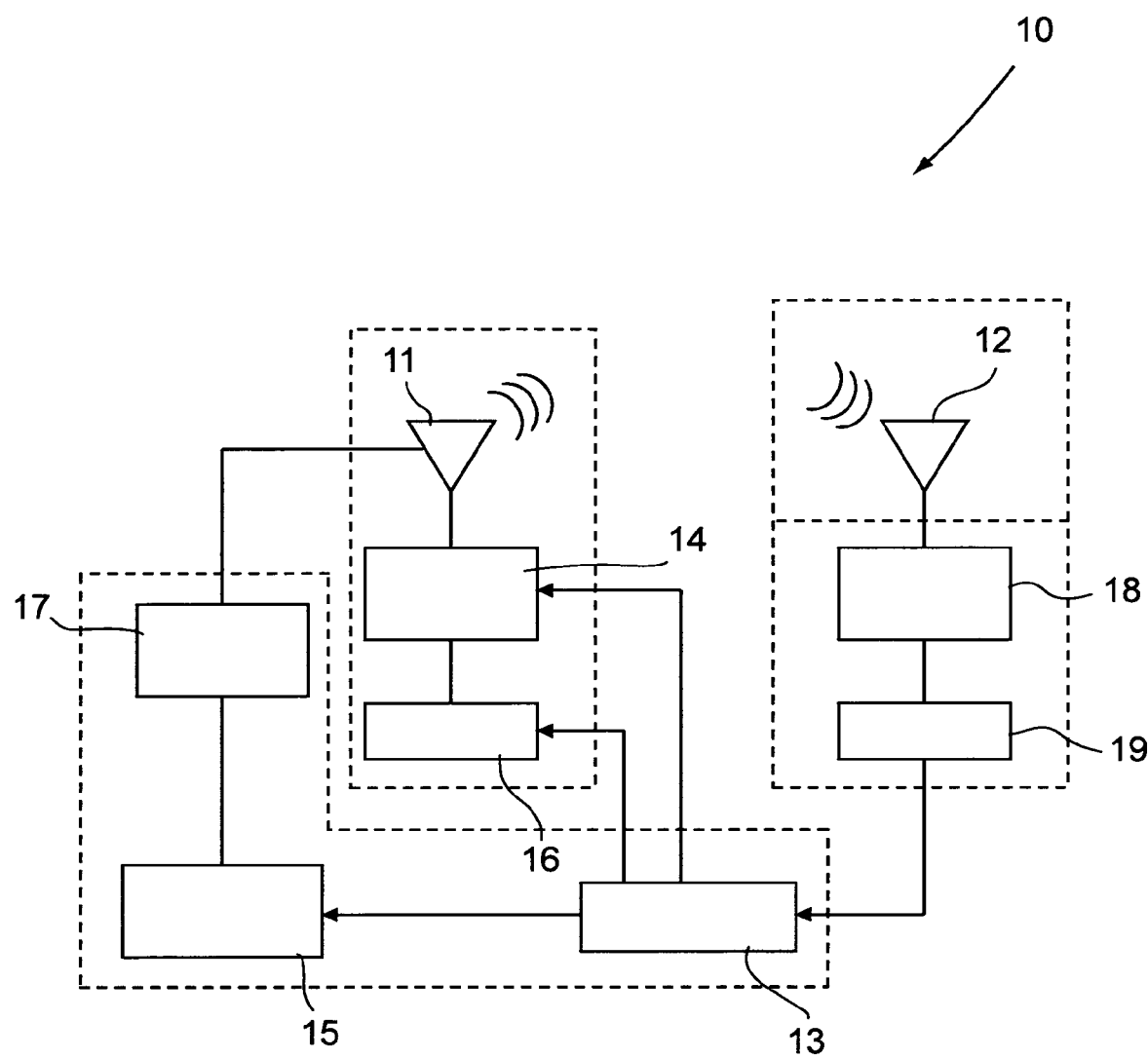
FIG. 1 is a block circuit diagram of an embodiment of the device for the optimized transmission of remote control signals according to the present invention.
Figure 2:
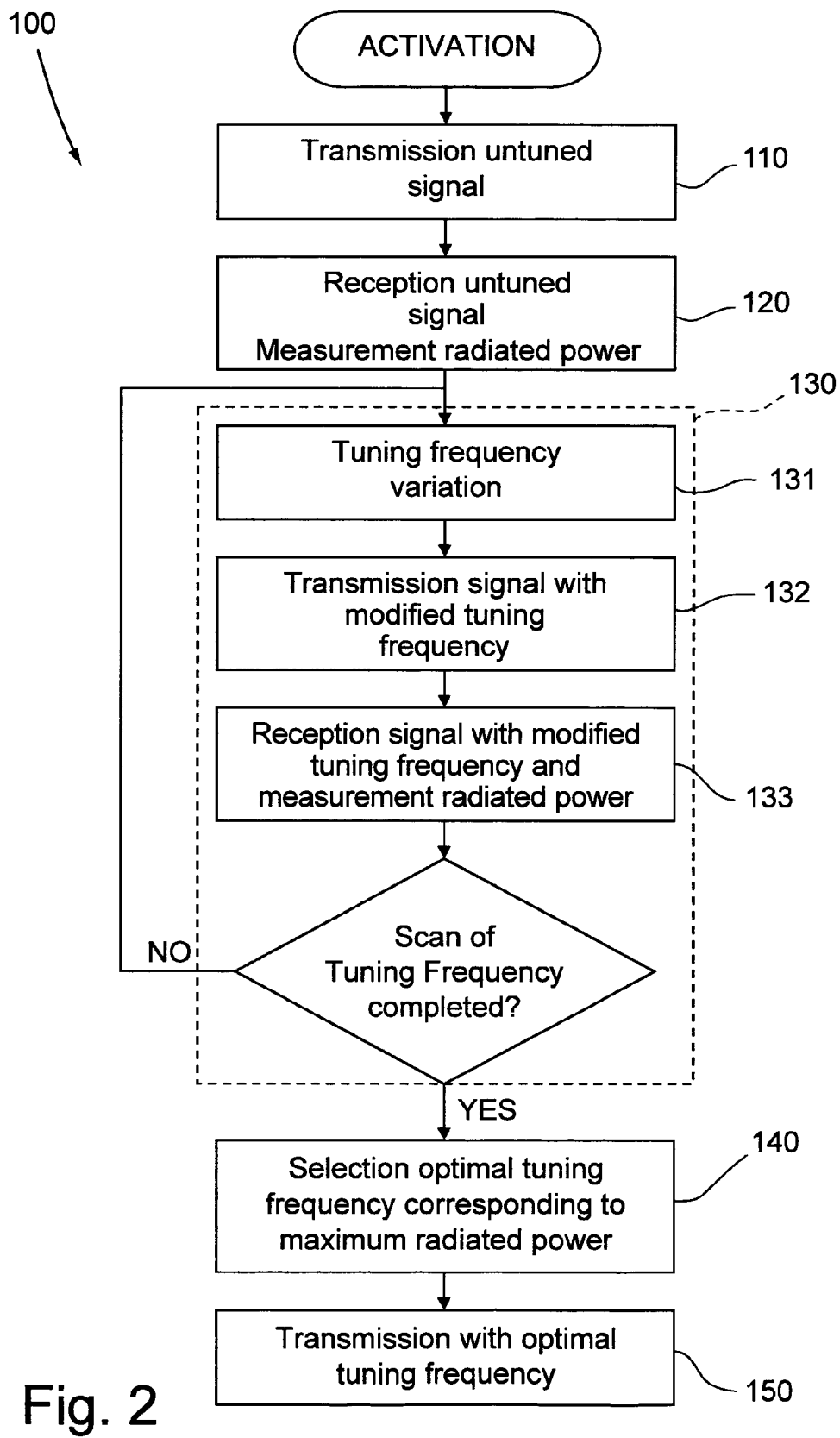
FIG. 2 is a flow diagram of the phases for the optimized transmission of remote control signals according to the present invention.

With reference to the figures, the scheme of a device for the optimized transmission of remote control signals is shown schematically, wholly indicated with 10.

Such a remote control transmitting device 10, comprises means for via-ether transmitting 11, 14, 16 for the transmission of opening and/or closing control signals to a receiving station located for example at an automatic gate to be actuated.

The means for via-ether transmitting 11, 14, 16 preferably comprise a via-ether transmission interface 11, for example an antenna, an amplification unit 14, for example a radio frequency amplifier, and a means for generating periodical waveforms 16, for example a square wave oscillator.

In particular, the via-ether transmission interface 11 is connected to the output of the amplification unit 14 that is in turn fed by the means for generating periodical waveforms 16.

The via-ether transmission interface 11 is thus able to transmit a periodical signal at a carrier frequency generated by the means for generating periodical waveforms 16 and amplified by the amplification unit 14.

Advantageously, such an amplification unit 14 and such a means for generating periodical waveforms 16 are both driven, as can be seen in FIG. 1, by an elaboration unit 13, preferably made through a microcontroller.

According to a preferred embodiment of the present invention such an elaboration unit is advantageously also able to actuate a means for generating continuous voltage 15.

The voltage generated by the means for generating continuous voltage 15 preferably drives a syntonizer means 17 that is used to vary the tuning frequency at which the via-ether transmission interface 11 is tuned. Indeed, such a syntonizer means 17 is preferably made through a voltage-controlled reactive circuit element like for example a varactor diode.

A varactor diode is characterised by the relevant capacitive effects that vary as the value of the inverse voltage applied to its terminals varies; in other words, such a diode can be schematised through a capacitor with variable capacity with the voltage applied at its terminals.

The syntonizer means 17, therefore, is advantageously directly connected to the via-ether transmission interface 11 so as to tune such an interface 11 to the frequency of the amplified remote control signal.

In a possible embodiment of the present invention, the via-ether transmission interface 11 is made through an inductive type antenna and the syntonizer means 17 through a varactor diode connected in parallel or in series with such an antenna.

Figure 3:
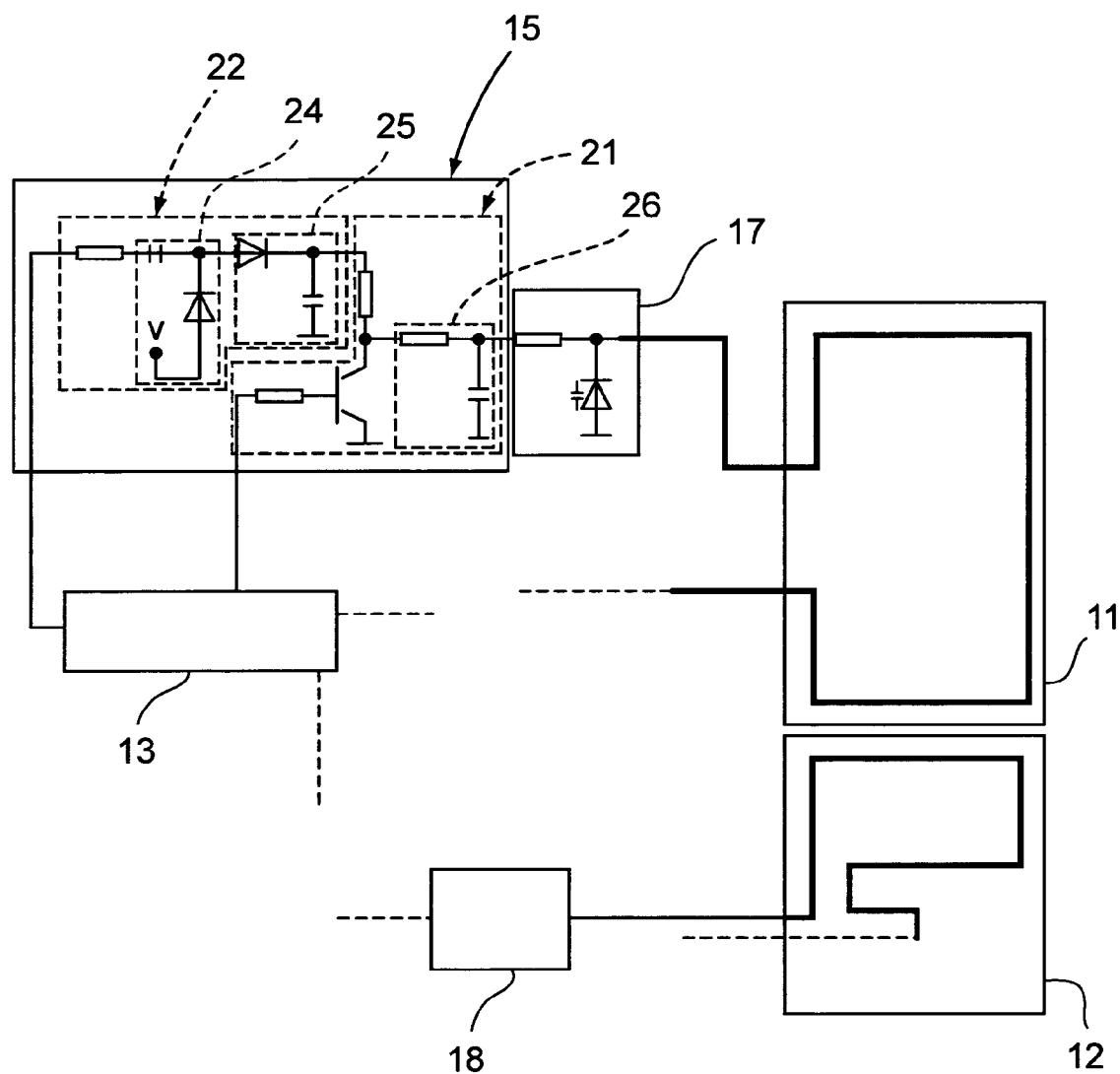
FIG. 3 is a partial circuit diagram of the device of FIG. 1.

In this case, as can be seen in FIG. 3, the means for generating continuous voltage 15 is advantageously made through a charge pump 22 and a direct current—direct current converter or DC-DC converter 21 of the chopper type connected in cascade with it. In detail, the charge pump 22 is fed by a square wave voltage signal generated by the elaboration unit 13 whereas the DC-DC converter 21 is able to adjust the voltage deriving from the charge pump 22 itself based on a variable duty cycle or PWM (Pulse Width Modulation) square wave signal also generated by the elaboration unit 13.

It is important to underline that in the particular embodiment illustrated the DC-DC converter 21 is a chopper type circuit comprising a transistor, used as a switch, and the charge pump 22 is made through resistors, condensers and diodes, avoiding the use of inductors that is common in the state of the art, which involve an increase in costs and bulk.

In particular, the charge pump 22 is a two-stage voltage multiplier 24, 25 each comprising a diode and a condenser connected in the way illustrated. As can be seen in FIG. 3, the first stage 24 is fed on one side by the voltage V to be multiplied, deriving for example from a battery (not illustrated) comprised in the device 10 for the optimized transmission of remote control signals, and on the other side by the aforementioned square wave voltage signal generated by the elaboration unit 13. Such a square wave signal is such as to alternatively lead the diodes of the first 24 and of the second 25 stage of the charge pump 22 into the state of interdiction allowing the doubling of the voltage V to be multiplied.

As is illustrated in FIG. 3, moreover, the DC-DC converter 21 of the chopper type comprises a filter of the RC or capacitive type 26, comprising at least one capacitor and at least one resistor, connected to the transistor, avoiding the use of filters of the inductive type comprising at least one inductor.

In this way, the variation of the control voltage of the varactor diodes, obtained by suitably varying the duty cycle of the PWM signal that drives the DC-DC converter 21, involves a variation of the capacity resulting from the varactor diode that modifies the resonance that is tuning frequency of the antenna.

According to a preferred embodiment of the present invention, advantageously the remote control transmitting device 10 is equipped with a via-ether receiving means 12 suitable for capturing the same signal transmitted via radio by the means for via-ether transmitting 11, 14, 16.

Such a via-ether receiving means 12 is connected to measuring means 18, 19, suitable for processing the modulated signal received.

In particular, the via-ether receiving means 12 is preferably connected to a peak detecting circuit 18 the output of which is in turn connected to an amplification unit 19. Such an amplification unit 19 is also connected to the elaboration unit 13.

The peak detector 18 is able to detect the peak of the voltage signal corresponding to the received remote control signal and such a peak is advantageously amplified by the amplification unit 19.

The via-ether receiving means 12 can also be used to programme the transmitting device.

In this case, therefore, the identification codes of the remote control signals are not stored in digital storage means associated with the elaboration unit 13 or set manually by the manufacturer at the moment of the production or the commissioning of the transmitting device, but rather they are received by another transmitting device that is said to operate in "teaching" mode.

The transmitting device 10 that receives the control signals through the via-ether receiving means 12 and stores the identification codes transmitted by them in the digital storage means is known as self-learning.

The method 100 for the optimized transmission of remote control signals implemented by the device for the optimized transmission 10 according to the present invention comprises a phase consisting of transmitting 110 a remote control signal following an activation, by a user, of one of the buttons present on the transmitting device.

For this purpose the remote control transmitting device 10 transmits 110 a carrier frequency signal, amplified to a certain power level; the carrier frequency signal is generated by the means for generating periodical waveforms 16, amplified by the elaboration unit 14 and transmitted by the via-ether transmission interface 11 tuned to an initial tuning frequency.

According to the present invention, after the transmission of the remote control signal, there are the phases consisting of receiving 120 the transmitted remote control signal and measuring its radiated power, as well as of varying 130 the tuning frequency of the via-ether transmission interface so as to maximize the measured radiated power.

The phase of receiving 120 consists of receiving the control signal transmitted by means of the via-ether receiving means 12 and detecting the peak of the corresponding voltage signal, which provides a measurement of the radiated power of the transmitted signal.

It is therefore possible to state that the via-ether receiving means 12 is coupled from an electromagnetic point of view with the via-ether transmission interface 11 through the concatenation of the lines of the radiated electromagnetic field with the via-ether receiving means 12 itself. An actual feedback circuit is thus made that comprises the via-ether connection between the via-ether transmission interface 11 and the via-ether receiving means 12 capable of ensuring the actual maximisation of the radiated power.

The peak detector 18 and the amplification unit 19, placed upstream of the via-ether receiving means 12, therefore provide the elaboration unit 13 with a voltage value proportional to the radiated power by the means for via-ether transmitting 11, 14, 16.

Such a measured voltage value proportional to the radiated power is preferably stored by the elaboration unit 13.

The phase of varying 130 the tuning frequency of the via-ether transmission interface 11 suitable for maximising its radiated power comprises a set of steps 131, 132, 133, which are carried out recursively.

Once the radiated power of the received control signal has been measured, the elaboration unit 13 commands the phase 130 of varying the tuning of the via-ether transmission interface 11 that consists of varying 131 the tuning frequency of such an interface 11 in a range of frequencies comprised between a maximum frequency value and a minimum frequency value.

For this purpose, the elaboration unit 13 varies the control voltage generated by the continuous voltage generating means 15 in a range of voltages comprised between a maximum voltage value and a minimum voltage value, in this way acting on the tuning frequency of the via-ether transmission interface 11 regulated by the syntonizer means 17.

In the case in which such a syntonizer means 17 comprises a voltage controlled capacity, the variation of the control voltage corresponds to a variation of such a voltage controlled capacity in a range of values comprised between a maximum capacity value and a minimum capacity value.

The carrier frequency signal is recursively transmitted 132 by the via-ether transmission interface 11 tuned to a modified tuning frequency with respect to the initial frequency and received by the via-ether receiving means 133 where the relative radiated power is determined. Every control voltage corresponds to a different tuning frequency of the via-ether transmission interface 11, 14, 16 and therefore a different value of the radiated power from such means for transmitting 11, 14, 16.

The elaboration unit 13 thus receives, for every control voltage value comprised between the maximum voltage value and the minimum voltage value, a different measured radiated power value.

At the end of the scanning of the control voltage within the range of voltages comprised between the maximum voltage value and the minimum voltage value, a phase 140 is foreseen in which the elaboration unit 13 determines the optimal control voltage, selecting the control voltage at which the tuning frequency is optimal and therefore the radiated power was at its maximum.

Once the optimal control voltage has been determined, the transmission 150 of the remote control signal takes place at maximum radiated power.

In a preferred embodiment, following the phase of activation, by a user, of one of the buttons present on the transmitting device, there is a preventive phase of checking that there are no other control signal transmitting devices that are transmitting, for example in "teaching" mode or in "command" mode.

In the case in which another transmitting device is detected that transmits in "teaching" mode, a self-learning procedure preferably begins.

In the case in which another transmitting device is detected that transmits in "command" mode, the transmitting device 10 is preferably prevented from transmitting until a new activation of one of the buttons of the transmitting device in order to avoid superposition of commands.

From the description that has been made the characteristics of the method and of the device for the optimized transmission of remote control signals object of the present invention are clear, just as the relative advantages are also clear.

The device according to the present invention, indeed, carries out an actual measurement of radiated power through the via-ether receiving means and the measuring means connected to it, creating an actual feedback that makes it possible to maximise the radiated power itself, not the voltage value across the via-ether transmission interface.

Therefore, through the process for maximising the radiated power by such a transmitting device, it is possible to reduce the effect of the degradation in performance in transmission.

The radiated power is maximised in real time and this therefore makes the transmission itself substantially independent from the tolerances of the components that make up the transmitting device and from the type of grip of the user.

Moreover, in this way the range of the transmitting device is substantially constant given that the radiated power is always optimised.

The realization of the continuous voltage generating means through the connection in cascade of a charge pump and of a chopper type DC-DC converter, permits to avoid the use of inductors, involving a substantial reduction of the manufacturing costs and of the area occupied by the continuous voltage generating means. It is underlined that such an embodiment of the voltage generating means permits to reduce the electromagnetic emissions, which are instead generated by the voltage fronts present in the circuits comprising DC-DC converters wherein an inductor used in commutation is present. Moreover, the use in the converter of the chopper type of a filter of the capacitive type instead of a filter of the inductive type makes the voltage in output to the means for generating continuous voltage more repeatable, permitting to obtain a high degree of repeatability of the performances of the device for the optimized transmission of remote control signals.

Finally, it is clear that the device and the method thus conceived can undergo numerous modifications and variants, all of which are covered by the invention; moreover, all of the details can be replaced with technically equivalent elements. In practice, the materials used, as well as the sizes, can be whatever according to the technical requirements.

The invention claimed is:

1. Method (100) for the optimized transmission of remote control signals comprising the phases that consist of:
   (a) transmitting (110) a remote control signal at a carrier frequency through a via-ether transmission interface (11) tuned to a tuning frequency;
   (b) receiving (120) said remote control signal transmitted in phase (a) through a via-ether receiving means (12);
   characterized in that it comprises the phases that consist of:
   (c) measuring the power of said signal received in phase (b);
   (d) varying (130) said tuning frequency of said via-ether transmission interface (11); and
   (e) determining (140) an optimal tuning frequency corresponding to a value of maximum power of said received signal.

2. Method (100) for the optimized transmission of remote control signals according to claim 1 characterized in that said phase (d) of varying (130) of said tuning frequency of said via-ether transmission interface (11) comprises the step consisting of varying said tuning frequency (131) in a range of frequencies comprised between a maximum frequency value and a minimum frequency value, said radiated power being at its maximum at an optimal value of said tuning frequency comprised between said maximum value and said minimum value.

3. Method (100) for the optimized transmission of remote control signals according to claim 2 characterized in that it comprises in addition the phase consisting of transmitting said remote control signal through said via-ether transmission interface (11) tuned to said optimal tuning frequency.

4. Method (100) for the optimized transmission of remote control signals according to claim 2 characterized in that said phase of varying said tuning frequency (131) of said remote control signal consists of varying a control voltage of a syntonizer means (17) in a range of voltages between a maximum voltage value and a minimum voltage value so as to identify said optimal tuning frequency.

5. Method (100) for the optimized transmission of remote control signals according to claim 2 characterized in that said phase of varying said tuning frequency (131) of said remote control signal consists of varying a voltage controlled capacity connected to said transmission interface (11) in a range of values comprised between a maximum capacity value and a minimum capacity value, so as to identify said optimal tuning frequency.

6. Method (100) for the optimized transmission of remote control signals according to claim 1 characterized in that said phase (120) of measuring said power of said remote control signal consists of measuring a voltage proportional to said power (120).

7. Device (10) for the optimized transmission of remote control signals according to claim 1 characterized in that said means for measuring (18, 19) the power of said received remote control signal comprise means for measuring a voltage proportional to said power.

8. Device (10) for the optimised transmission of remote control signals comprising means for via-ether transmitting (11, 14, 16) a remote control signal characterized in that it comprises means for via-ether receiving (12) said remote control signal transmitted by said means for transmitting (11,14,16), said means for via-ether receiving (12) being connected to means for measuring (18, 19) the power of said received remote control signal, said means for measuring (18, 19) the power of said received signal being connected to means for varying (13, 15, 17) the tuning frequency of said means for via-ether transmitting (11, 14, 16), said varying means (13, 15, 17) comprising an elaboration unit (13) that determines an optimal tuning frequency corresponding to a value of maximum power of said received signal.

9. Device (10) for the optimized transmission of remote control signals according to claim 8 characterized in that said means for via-ether transmitting (11, 14, 16) comprise a via-ether transmission interface (11) connected to an amplification unit (14), in turn fed by a means for generating periodical waveforms (16).

10. Device (10) for the optimized transmission of remote control signals according to claim 9 characterized in that said means for varying (13, 15, 17) said tuning frequency of said means for via-ether transmitting (11, 14, 16) comprise a syntonizer means (17) connected to said via-ether transmission interface (11) and driven by said elaboration unit (13) based on said measured power.

11. Device (10) for the optimized transmission of remote control signals according to claim 10 characterized in that said syntonizer means (17) is voltage controlled, said means for varying (13, 15, 17) said tuning frequency comprising a means for generating continuous voltage (15) driven by said elaboration unit (13).

12. Device (10) for the optimized transmission of remote control signals according to claim 10 characterized in that said via-ether transmission interface (11) is of the inductive type and said syntonizer means (17) comprises a variable voltage controlled capacity connected to said via-ether transmission interface (11).

13. Device (10) for the optimized transmission of remote control signals according to claim 12 characterized in that said means for generating continuous voltage (15) is made through a charge pump (22) and a direct current—direct current converter (21) of the chopper type connected in cascade with it.

14. Device (10) for the optimized transmission of remote control signals according to claim 8 characterized in that said means for measuring (18, 19) the power comprise a peak voltage detector (18) connected to an amplifier (19).

* * * * *